United States Patent [19]

Muramatsu et al.

[11] Patent Number: 5,092,990
[45] Date of Patent: Mar. 3, 1992

[54] FILTER DEVICE

[75] Inventors: Yasuyuki Muramatsu; Shoji Nakamichi; Yutaka Kondo; Toru Kubo, all of Iwata, Japan

[73] Assignee: Kabushiki Kaisha Aiaishi, Japan

[21] Appl. No.: 503,878

[22] Filed: Apr. 3, 1990

[30] Foreign Application Priority Data

Apr. 4, 1989 [JP] Japan .................... 1-85133

[51] Int. Cl.$^5$ ............... B01D 24/48; B01D 27/02; B01D 27/06
[52] U.S. Cl. ................... 210/136; 210/193; 210/287; 210/321.87; 210/493.5; 210/500.23
[58] Field of Search ........... 210/493.1, 493.5, 193, 210/136, 287, 321.64, 321.87, 500.23

[56] References Cited

U.S. PATENT DOCUMENTS

| | | | |
|---|---|---|---|
| 3,193,101 | 7/1965 | Humbert, Jr. | 210/130 |
| 3,625,363 | 12/1971 | Eberle | 210/130 |
| 4,051,033 | 9/1977 | Blace | 210/193 |
| 4,495,068 | 1/1985 | Rosaen | 210/136 |
| 4,552,657 | 11/1985 | Ogawa | 210/493.1 |
| 4,714,546 | 12/1987 | Solomon et al. | 210/37 |

FOREIGN PATENT DOCUMENTS 0364111 4/1990 European Pat. Off. .
1202759 10/1965 Fed. Rep. of Germany .

Primary Examiner—Robert A. Dawson
Assistant Examiner—Wanda L. Millard
Attorney, Agent, or Firm—Thomas W. Tolpin

[57] ABSTRACT

A filter device for cleaning water and having a reinforcing member for preventing reduction of filtering area due to deformation of filter membrane. The filter device comprises a generally cylindrical casing and a filter element contained in said casing for passing water from the primary side thereof to the secondary side thereof, the filter element including a corrugated filter membrane and a reinforcing member for supporting the corrugated filter membrane. The filter device is particularly suited for use together with a powdered absorbent such as activated carbon.

11 Claims, 4 Drawing Sheets

FILTER DEVICE

BACKGROUND OF THE INVENTION

1. Field of the Invention

The present invention relates to a filter device for removing impurities, such as residual chlorine, from city water or like. Particularly, it relates to a filter device having means for preventing reduction of filtering area due to deformation of filter element. The present invention provides an improvement in structure of the filter element adapted to be used with a powdered absorbent which adheres onto the surface of the filter element to form a pre-coat layer so that the adhering pre-coat layer is retained evenly during the filtering operation and retained permanently for an extended time period.

2. Prior Art Statement

City water generally contains residual chlorine or other impurities which provide unpleasant ordor or taste. In order to remove such impurities, it is a common practice to filter city water to remove such impurities by the use of a filter device in which an absorbent, such as activated carbon, is contained.

Examples of known filter device of this type are disclosed in Unexamined Japanese Utility Model Publication Nos. 16739/1975 and 100367/1975, wherein a filter cloth is formed to be in a pouch which is folded and contained in a casing, and activated carbon powder particles are filled in the casing to surround the pouch. As water is introduced initially into the filter device, the activated carbon powder particles adhere to the surface of the pouch to form a pre-coat layer. In the filter device of this type, city water is cleaned by the filtering action of the filter cloth and impurities contained therein are absorbed by activated carbon powder particles forming the pre-coat layer.

However, since the filter cloth in the known filter device is simply folded and contained in the casing not to be firmly retained to keep its shape, the shape of the folded filter cloth is changed due to change in pressure of the flowing water caused by repeated operations of initiating and terminating the passage of water or due to increase in pressure caused by clogging of water, leading to reduction of the filtering area.

The known filter device has further disadvantages that the pre-coat layer cannot be formed evenly over the entire surface area of the filter cloth and that the formed pre-coat layer tends to be cracked or otherwise damaged.

The aforementioned disadvantages of the known filter device is lead from the fact that the shape of the filter cloth pouch is not firmly retained to make it impossible to provide uniform gaps between the adjacent pleats of the folded filter cloth and also between the filter cloth and the inner surface of the casing so that activated carbon particles cannot adhere evenly to the surface of the filter cloth to form the pre-coat layer of uniform thickness. Furthermore, no pre-coat layer is formed on the portions at which adjacent pleats of filter cloth contact with each other, or the pleat of the filter cloth contacts with the surface of the casing, to leave the uncoated filter cloth.

Since the filter cloth is not retained to hold its shape, as described above, and simply folded into an irregular shape, fine wrinkles are formed on the filter cloth. These fine wrinkles ruffle frequently as the water pressure is changed by the initiation and termination of water supply to cause cracking of the pre-coat layer adhering onto the surface of the filter cloth. Accordingly, the pre-coat layer formed on the surface of the filter cloth cannot be retained permanently.

OBJECTS AND SUMMARY OF THE INVENTION

A primary object of this invention is to provide a filter device having a filter element which retains its shape even when the pressure of water passing therethrough is changed.

Another object of this invention is to provide a filter device having a filter membrane which is supported by a reinforcing member not to be deformed even when the water pressure applied thereto is changed so that reduction of the filtering area of the filter membrane is prevented.

A further object of this invention is to provide a filter device in which an even pre-coat layer is formed over the surface of the filter cloth and retained substantially permanently without forming cracks.

With the aforementioned objects in view, the present invention provides a filter device for cleaning water, comprising a generally cylindrical casing and a filter element contained in said casing for passing water from the primary side thereof to the secondary side thereof, said filter element including a corrugated filter membrane and a reinforcing member for supporting said corrugated filter membrane.

According to a preferred embodiment, the reinforcing member is a corrugated support member having an outer surface contacting with the ocrrugated filter membrane and made of, for example, a net. According to another preferred embodiment, the reinforcing member comprises a cylindrical member contained in the casing and having plural ribs protruding radially from the outer periphery thereof to support the corrugated filter membrane.

In the filter device of this invention, the corrugated filter membrane is contained in a cylindrical casing and supported by the reinforcing member to retain its shape not to be deformed by the change or increase in pressure of flowing water.

Accordingly, deformation of the filter membrane is prevented to obviate reduction of the filtering area. When a pre-coat layer of absorbent powder particles is formed over the filter membrane, the absorbent powder particles adhere evenly over the surface of the filter membrane to form a uniform pre-coat layer since the surface of the corrugated filter membrane is arranged regularly to be spaced by uniform furrows and prevented from contacting with other portion of the filter membrane or the inner wall of the casing. As a result, the pre-coat layer is retained substantially premanently without suffering from cracking or like damage.

BRIEF DESCRIPTION OF THE DRAWINGS

The present invention will be described in detail with reference to the drawings showing presently preferred embodiments thereof in which.

DESCRIPTION OF PREFERRED EMBODIMENTS

Figure 1:
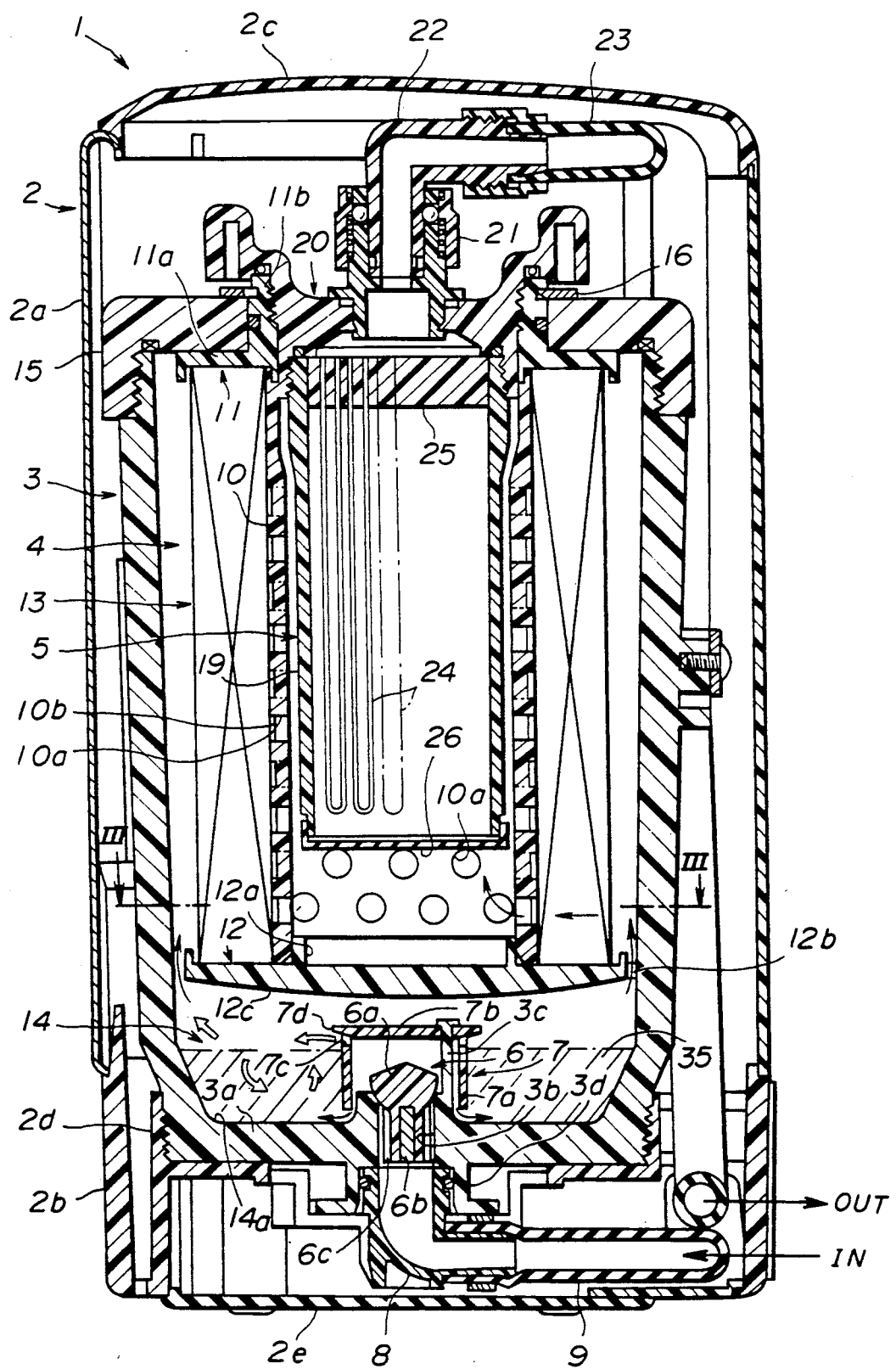
FIG. 1 is a sectional view showing an embodiment of the filter device of this invention.
Figure 2:
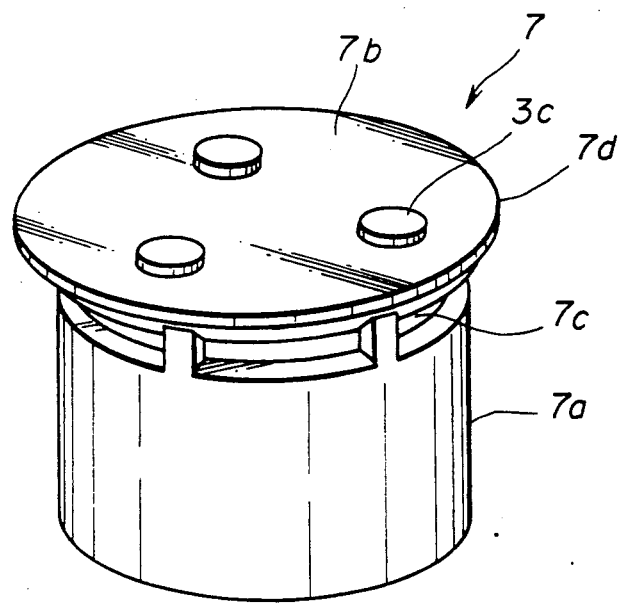
FIG. 2 is a perspective view showing a spouting block disposed at the bottom of the filter device shown in FIG. 1.

Preferred embodiments of this invention will now be described in detail with reference to appended drawings.

Initially referring to FIGS. 1 to 4 showing a preferred embodiment of the filter device of this invention, a filter device generally denoted by 1 comprises an outer casing 2, an inner casing 3 arranged in the outer casing 2, a filter unit 4 serving as a primary filter element and contained in the inner casing 3, and a hollow fiber unit 5 serving as a secondary filter element and contained internally of the filter unit 4.

The outer casing 2 comprises a synthetic resin base block 2b, a metal cylinder 2a detachably mounted on the base plate 2b, and a top lid 2c closing the top opening of the cylinder 2a.

The inner casing 3 has a generally cylindrical contour with the upper portion of the cylindrical wall slightly converged in the downward direction. The inner periphery of the lower portion 3a of the cylindrical wall is tapered to form a greatly converged bottom portion of the inner casing 3. The outer periphery of the lower portion 3a is threaded into a connecting bore 2d of the base block 2b of the outer casing 2 so that the inner casing 2 is fixedly mounted to the outer casing 2.

A water inlet port 3b is formed through the bottom of the inner casing 3 at the substantial center of the bottom wall of the cylindrical casing 3, the bottom wall being integral with the lower portion 3a of the cylindrical wall, and a check valve 6 is mounted to the inlet port 3b. The check valve 6 prevents water from returning downwards in FIG. 1, and comprises a rubber valve body 6a disposed to cover the upper opening of the inlet port 3b to open and close the inlet port 3b, and a weight 6b embedded in the valve body 6a for biasing the valve body 6a normally downwards. Guide ribs 6c are provided to receive the lower end of the valve 6.

A spouting block 7 is disposed above the inlet port 3b to cover the same. The spouting block 7 comprises a cylindrical wall 7a to surround the inlet port 3b so that a small gap is formed between the inner periphery of the cylindrical wall 7a and the outer peripheral wall through which the inlet port 3b is formed, and a top plate 7b for closing the space above the inlet port 3b. Support legs 3c extend from the edge portions of the inlet port 3b and have the upper ends welded to the top plate 7b so that the spouting block 7 is fixed in position. Plural slits are formed through the upper periphery of the cylindrical wall 7a to form spouting ports 7c which are overhung by the peripheral edge portion of the top plate 7b forming a roof 7d for the supporting ports 7c as best seen from FIG. 2.

A connection pipe 3d is integrally formed with the bottom wall of the inner casing 3 to extend below the inlet port 3b and have its lower end connected with one end of a connecting elbow 8, the other end of the connecting elbow 8 being connected with one end of a water supply hose 9. The connecting elbow 8 is fixed to the base block 2b so that it communicates with the connection pipe 3d as the inner casing 3 is mounted to the base block 2b. Reference numeral 2e designates a rubber bottom lid which extends below the water supply hose 9 and serves as non-slip means when the filter device 1 is placed on a table or other place (see FIG. 1).

The filter unit 4 comprises a center core 10, a top plate 11 mounted on the top end of the center core 10, a bottom plate 12 mounted to the bottom end of the center core 10, and a filter element 13 disposed to surround the outer periphery of the center core 10. The center core 10 is a synthetic resin cylinder in the illustrated embodiment, and has a cylinderical wall on which plural grooves 10b are formed and spaced by predetermined pitches. Multiple through-holes 10a are formed through each groove 10b to extend along a predetermined direction. The top plate 11 is made of a synthetic resin and has an annular closing extension 11a and a generally cylindrical connection rising 11b extending vertically from the inner periphery of the annular closing extension 11a. The top plate 11 is fixed to the top end of the center core 10. The connection rising 11b of the top plate 11 is inserted into a retainer cap 15 and prevented from slipping out of the retainer cap 15 by means of a circlip 16. The retainer cap 15 is screw fitted over the inner casing 3 to fix the filter unit 4 within the inner casing 3.

The bottom plate 12 is made of a synthetic resin disk and fixed to the lower end of the center core 10. Plural projections 12b protrude from the outer edge of the bottom plate 12, the projections 12b being spaced from the adjacent projections 12b by predetermined angular spacings so that the center of the bottom plate 12 is coincident with the center axis of the center core 10, so that some gap is formed between the outer edge of the bottom plate 12 and the inner peripheral wall of the inner cylindrical casing 3. The gap formed around the edge of the bottom plate 12 provides plural slits having constant width as best seen from FIG. 3. The bottom surface 12c of the bottom plate 12 is arcuated and spaced from the bottom wall 3a of the inner casing 3 by a predetermined spacing. This spacing defines a mixing chamber 14 in which water and activated carbon powder particles are mixed together, and the aforementioned spouting block 7 is positioned at the substantial center of this mixing chamber 14.

Figure 3:
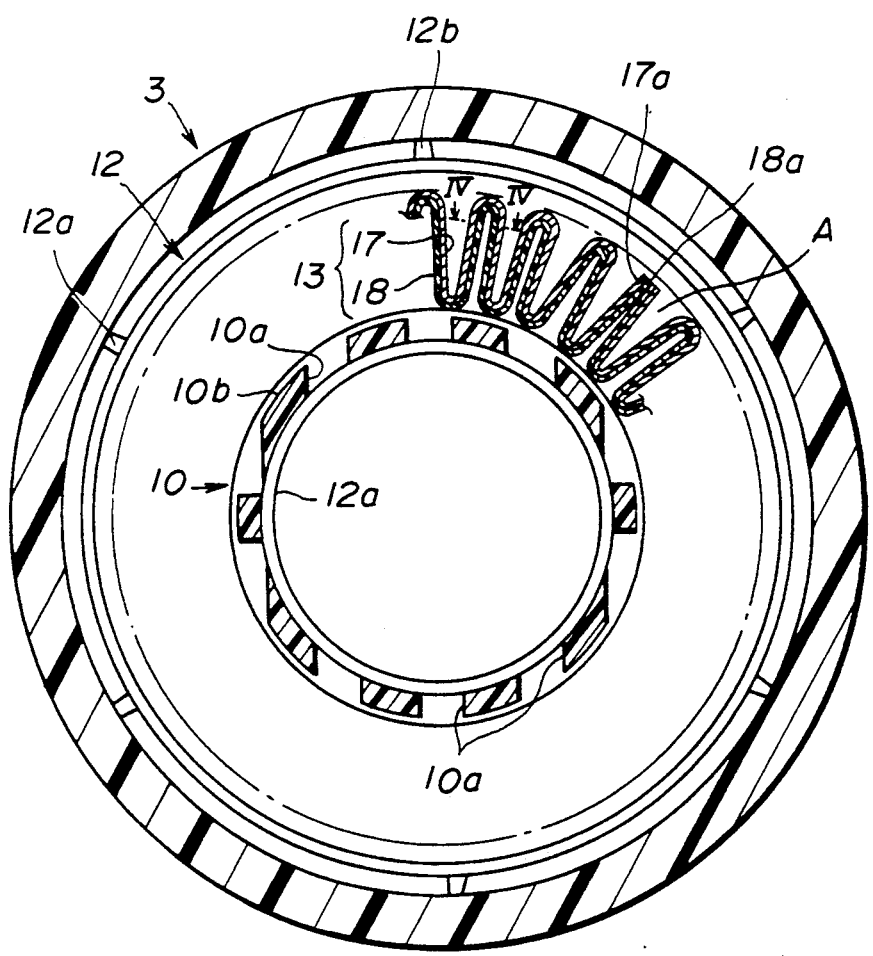
FIG. 3 is a cross sectional view taken along line III—III of FIG. 1.

As shown in FIG. 3, the filter element 13 comprises a corrugated filter membrane 17 which is made of a filter cloth and shaped to have a generally cylinderical contour, and a support net 18 serving as a reinforcing member for contacting with the inner surface of the corrugated filter membrane 17. A pre-coat layer 37 having a uniform thickness is formed over the outer surface of the filter membrane 17, the pre-coat layer 37 being formed of activated carbon powder particles adhering evenly on the outer surface of the filter membrane 17 (see FIG. 4). The support net 18 used in the illustrated embodiment is an integral molded product of a synthetic resin and corrugated to have the same contour as that of the filter membrane 17. Multiple through-holes 18b are formed through the support net 18 to introduce filtered water into the center core 10. The ends 17a of the filter membrane 17 are joined to the ends 18a of the support net 18 by hot melting, and the ends 18a of the support net 18 are also welded together by hot melting.

The hollow fiber unit 5 comprises multiple hollow fibers 24 contained in a protectionc casing 19 having a support cap 20 which is screw-fitted with the connection rising 11b of the top plate 11 of the primary filter unit 4. The support cap 20 is connected through a coupling 21 and a connecting elbow 22 to a filtered water feed hose 23 which extends through the bottom of the outer casing 2 to the outside of the filter device 1. An opening is provided on the bottom of the protection casing 19, and this bottom opening is covered by a net 26.

The hollow fibers 24 contained in the protection casing 19 are fibers made of a synthetic resinous material, and has numerous micro-pores serving as filtering pores. Each of the fiber tubes 24 has a generally U-shaped section with the upper ends fixed to a resin layer 25 so that the opening defined by the legs of the letter U when viewed in section faces to the support cap 20. The resin layer 25 is fixed at an upper portion of the protection casing 19 so that the upstream side of the hollow fiber unit 5 communicates through the fine filtering pores of the hollow fibers 24 with the filtered water feed hose 23. The outer periphery of each hollow fiber tube 24 has been subjected to anti-microbial treatment.

The operation and function of the illustrated embodiment will now be described.

Initially, the operations of washing or replacing the filter unit 4 and the hollow fiber unit 5 will be described. The cylinderical wall 2a of the outer casing 2 is removed from the base block 2b, and the filtered water feed hose 23 is removed by releasing the coupling 21. The filter unit 4 and the hollow fiber unit 5 may be removed by unscrewing the retainer cap 15. Otherwise, only the hollow fiber unit 5 may be removed by unscrewing the support cap 20 from the connection rising 11b of the top plate 11 while keeping the retainer cap 15 in the screwed condition. Meantime, when it is desired to remove the inner casing 3 in its entirety, the inner casing 3 is unscrewed from the connecting bore 2d of the base block 2b. Since the check valve 6 is contained in the inner casing 3, water contained in the inner casing 3 is prevented from flowing out of the inner casing 3 even when the inner casing 3 is removed in its entirety from the filter device 1.

In order to form a pre-coat layer 37 of activated carbon powder particles over the outer surfaces of the filter membrane 17, the filter unit 4 is removed together with the hollow fiber unit 5, and then activated carbon powder particles 35 are charged into the mixing chamber 14 so that the upper surface of the thus charged activated carbon particles is below the level lower than the height of the spouting ports 7c (namely, below the level shown by the dot-and-dash line in FIG. 1). Thereafter, the filter unit 4 and the hollow fiber unit 5 are assembled within the filter device 1, and then water is supplied into the filter device 1. Whereupon, the check valve 6 is pushed upwards by the supplied water to allow water to flow into the spouting block 7 and to spout through the spouting ports 7c of the spouting block 7 while stripping the activated carbon powder particles 35 from the surface of the piled bulk of the activated carbon powder particles 35. Eddy currents are formed within the mixing chamber 14 as the flow rate of supplied water increases as shown by the arrows in FIG. 1, so that the activated carbon powder particles are uniformly mixed with water. Water mixed with activated carbon particles flows upwards through the gap formed between the edge of the bottom plate 12 of the filter unit 4 and the inner peripheral wall of the inner casing 3. As the water passes through the filter membrane 17, the activated powder carbon particles entrained by the flowing water adhere on the outer surface of the filter membrane 17 so that the pre-coat layer 37 is formed as shonw in FIG. 4.

In normal operation when the filter device 1 is used as a device for cleaning city water, city water is supplied through the water supply hose 9 and passes through the spouting ports 7c of the spouting block 7 into the mixing chamber 14 from which it passes through the filter membrane 17 of the filter unit 4, the through-holes 18b of the support net 18, the inlet ports 10a of the center core 10, the net 26, and the micro-pores of the hollow fibers 24 contained in the hollow fiber unit 5, and then discharged throughthe filtered water feed hose 23 to the outside of the filter device 1. Prior to be filtered by the filter membrane 17, impurities including residual chlorine contained in water are absorbed by the pre-coat layer 37. In the donwstream of the filter membrane 17, passage of bacteria or other micro-organisms is prevented by micro filtering pores of the hollow fibers 24 so that such micro-organisms are not contained in the filtered water.

The pre-coat layer 37 of activated carbon powder particles adhering on the surface of the filter membrane 17 is considerably improved in uniformity and durability by the following three advantageous merits of this invention.

The first merit resides in that the activated carbon powder particles are mixed into water sufficiently uniformly by the provision of the mixing chamber 14 having a construction and contour well suited for the formation of swirling eddy currents. In detail, the mixing chamber 14 is defined by a substantially closed spaced while leaving a narrow gap communicating with the filter unit 4 and formed between the outer edge of the bottom plate 12 and the inner peripheral wall of the inner casing 3, the ceiling of the mixing chamber 14 being defined by an arcuated bottom surface 12c of the bottom plate 12 and the lower portion of the side wall of the mixing chamber 14 being defined by the tapered lower portion 3a having a greater tapering angle. The spouting block 7 is disposed at the substantial center of the mixing chamber 14, the spouting ports 7c being opened to surround the center axis of the inner casing 3 above the upper surface of the piled bulk of activated carbon powder particles. As an advantageous result of the aforementioned contour and construction of the mixing chamber 14, water spouting through the spouting ports 7c is reflected by the surfaces of the bottom plate 12 and the inner peripheral wall of the inner casing 3 to form many swirling eddy currents as shown by the arros in FIG. 1 so that activated carbon powder particles are stripped from the surface of the piled bulk to be sufficiently mixed into water to form a uniform mixture. Since the corners 14a of the mixing chamber 14 are rounded, activated carbon powder particles are not left in the corners 14a.

If the check valve is disposed at the inlet portion of the mixing chamber in an exposed condition, activated carbon powder particles sediment as the water supply is stopped to be deposited on the interfaces between the valve body and the valve seat to damage the function of the check valve. However, according to the illustrated embodiment of this invention, the check valve 6 is covered by the spouting block 7 having spouting port 7a overhung by roof portion 7d to prevent deposition of activated carbon powder particles on the interfaces between the valve body 6a and the valve seat.

The second merit resides in that the water entraining the activated carbon powder particle in the sufficiently mixed condition is fed evenly onto the surface of the filter membrane 17. In detail, water entraining the activated carbon powder particles flows through the throttled gap between the inner peripheral wall of the inner cylindrical casing 3 and the edge of the bottom plate 12 to move upwards within the filter unit 4, and the entrained activated carbon powder particles adhere on the outer surface of the corrugated filter membrane 17 as the water passes through the filter membrane 17 into the center core 10. Since the spouting block 7 is disposed at the substantial center of the mixing chamber 14 and the throttled gap has uniform width by the provision of plural projections 12b projecting from the circumference of the edge of the bottom plate 12 while being spaced by equal angular spacing with each other, water is fed uniformly over the entire circumference of the filter membrane 17 shaped to have a generally cylindrical contour.

The third merit resides in that the filter membrane 17 is supported by the reinforcing member or support net 18 to retain its initial shape. The spaces between the adjacent pleats of the corrugated filter membrane 17 or the spaces between respective pleats and the inner surface of the inner casing 3 have substantially equal volumes over the entire circumference of the generally cylinderical filter membrane 17, thus substantially equal volume of water is fed to each pleat of the corrugated filter membrane 17.

As the result of the aforementioned three merits, activated carbon particles adhere evenly on the surface of the filter membrane 17 to form a pre-coat layer 37 having a uniform thickness. Any portion of the filter membrane 17 is prevented from contacting with another portion or the surface of the inner casing 3, and the pre-coat layer 37 is evenly formed on the overall surface of the filter membrane 17.

According to a further merit of this invention, the pre-coat layer 37 is durable permanently for the following reason. Since the filter membrane 17 is supported by the support net 18 to retain its original shape without forming fine wrinkles, the shape of the filter membrane 17 is not changed even when the pressure applied thereto is changed by the initiation or termination of water supply. Accordingly, the pre-coat layer 37 is not suffering from cracking to retain its uniform thickness for a long time to be improved its durability.

Since the shape of the filter membrane 17 is not changed as aforementioned, the filtering area is not reduced as a matter of course.

Figure 5:
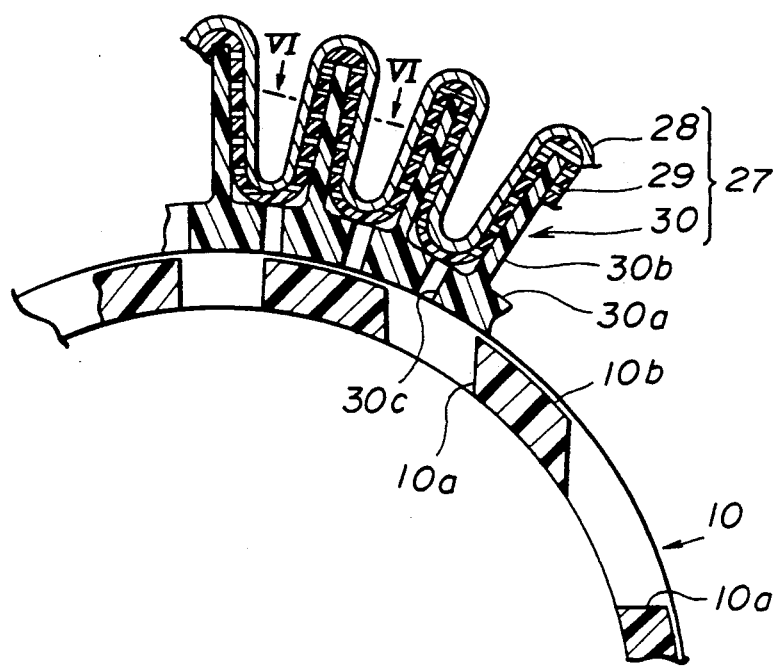
FIG. 5 is a sectional view showing an altered construction of the filter element contained in the filter device of this invention.
Figure 6:
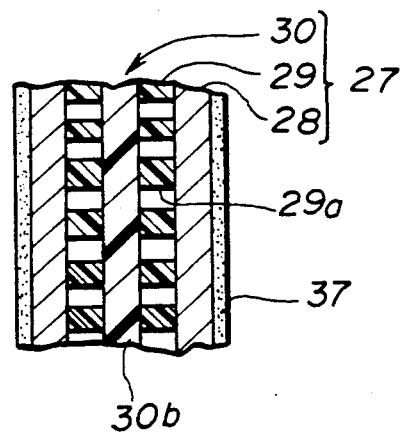
FIG. 6 is a cross sectional view taken along line VI—VI of FIG. 5.
Figure 4:
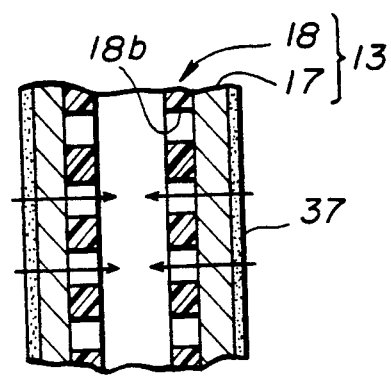
FIG. 4 is a cross sectional view taken along line IV—IV of FIG. 3.

An altered embodiment of the filter element is shown in FIGS. 5 and 6.

Similar to the preceding embodiment, a filter element 27 of the altered embodiment comprises a corrugated filter membrane 28 shaped to have a generally cylindrical contour, and a support net 29 (first reinforcing member) having multiple through-holes 29a and having the same corrugated cylindrical shape as that of the filter membrane 28. In addition, support pipes 30 serving as second reinforicing means are disposed internally of the aforementioned support net 29 in this altered embodiment. The support pipe 30 serving as the second reinforcing means has plural support ribs 30b protruding from the outer periphery of a cylindrical member 30a fitted around the cylindrical center core 10 to support each pleat of the corrugated support net 29. The pipe 30a is provided with multiple through-holes 30c to pass water therethrough.

Since the filter membrane 28 is supported by the support net 29 which is supported in situ by the support pipes 30 in the altered embodiment, the filter element 27 is ensured to retain its corrugated shape to further improve the uniformity and durability of the pre-coat layer 37. In this altered embodiment, water filtered through the filter membrane 28 passes through the through-holes 29a of the support net 29 and the interface between the support net 29 and the support ribs 30b into the center core 10.

Figure 7:
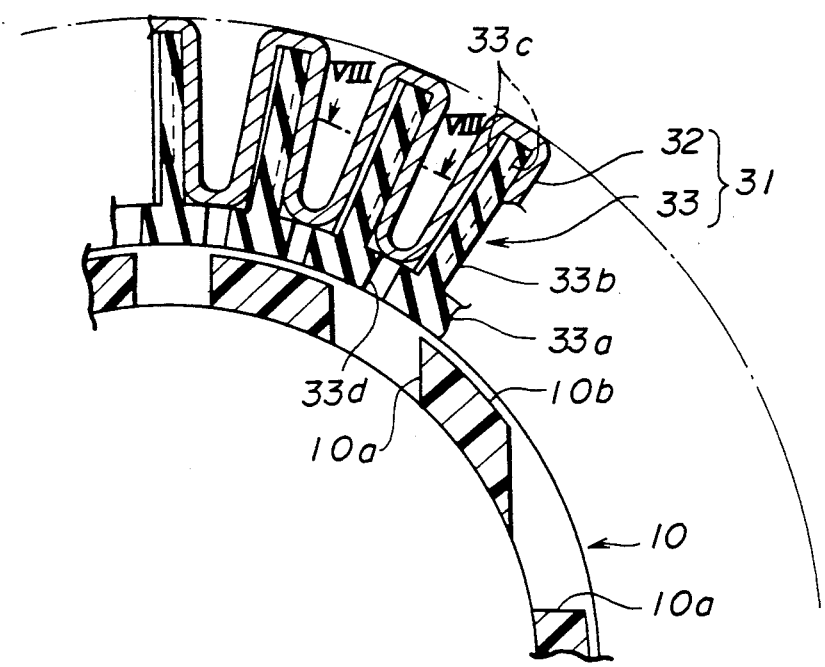
FIG. 7 is a sectional view similar to FIG. 5, showing a further modified construction of the filter element contained in the filter device of this invention.
Figure 8:
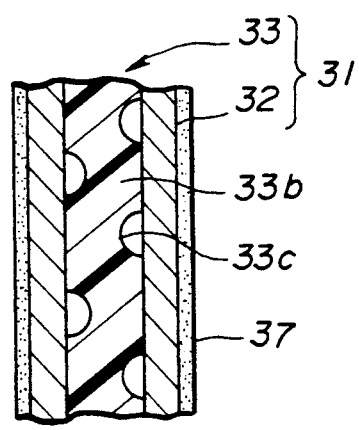
FIG. 8 is a cross sectional view taken along line VIII—VIII of FIG. 7.

A further modified construction of the filter element is shown in FIGS. 7 and 8.

A filter element 31 according to the further modified embodiment comprises a filter membrane 32, and a support pipe 33 which contacts directly with the inner surface of the corrugated pleats of the filter membrane 32. No support net is provided in this modified embodiment. The support pipe 33 is cylindridal and fitted around the outer periphery of the center core 10, and comprises a pipe 33a and multiple support ribs 33b protruding from the pipe 33a to support respective pleats of the corrugated filter membrane 32. The thickness of each rib 33b is thicker than that of the rib 30b of the preceding altered embodiment, and each rib 33b is provided with plural grooves 33c extending in the radial direction for guiding water filtered through the filter membrane 32 into the center core 10.

The thicker ribs 33b of the support pipe 33 of the filter element 31 of this embodiment are rigid to ensure the filter membrane 32 to retain its original shape and to improve the uniformity and durability of the adhering pre-coat layer 37.

Although the reinforcing members are disposed internally of the filter membranes in the aforementioned embodiments, the reinforcing members may be disposed externally of the filter membranes without departing from the spirit of this invention. Although the center core 10 is provided in the aforementioned embodiments, the center core 10 may be dispensed since the original shape of the filter membranes can be retained only by the provision of the reinforcing members.

Although the filter membrane used in the aforementioned embodiments is a filter clotch, the filter cloth may be replaced by any other filter membranes, such as filter paper, non-woven cloth or porous films. Likewise, the activated carbon powder particles used to form the pre-coat layer may be replaced by any other absorbent particles, such as fine particles of diatomaceous earth.

Although a pre-coat layer is formed in the aforementioned embodiments, the present invention may be applied to a filter device in which granular activated carbon is used without forming the pre-coat layer. Disadvantageous reduction of filtering area due to deformation of the filter membrane can also be prevented when the invention is applied to the filter element in which no pre-coat layer is formed.

As should be appreciated from the foregoing, the filter device of this invention has a filter element comprising a corrugated filter membrane shaped to have a generally cylindrical contour and a reinforcing member for supporting the corrugated filter membrane, whereby the original shape of the filter membrane is retained permanently irrespective of change or increase of the applied water pressure to prevent reduction of the filtering area. In addition, when a pre-coat layer of absorbent particles is formed in the filter device, the uniformity and durability of the pre-coat layer is improved by the provision of the reinforcing member.

What is claimed is:

1. A filter device for cleaning water and for use with a pre-coat layer of powdered absorbent, comprising:
    a generally cylindrical casing having an inner wall, an outer wall, and a bottom with a central portion defining a center, and
    a filter element contained in said casing for passing water from a primary side thereof to a secondary side thereof,
    said filter element including
        a corrugated filter membrane having an outer surface and an inner surface providing an inner contour, said corrugated filter membrane cooperating with and adhered to a powdered absorbent to form a pre-coat layer on the outer surface of said corrugated filter membrane at said primary side, and
        a reinforcing member for supporting said corrugated filter membrane, said reinforcing member being disposed internally of said corrugated filter membrane, said reinforcing member having an outer contour contacting closely with the inner contour of said corrugated filter membrane, and said reinforcing member defining multiple pores for allowing water to pass therethrough so that the shape of said corrugated filter membrane is retained even when the pressure of water passing therethrough is changed.

2. The filter device according to claim 1, further comprising:
    a bottom plate disposed at the bottom of said filter element, said bottom plate having a peripheral edge with a diameter smaller than the diameter of the inner wall of said cylindrical casing, said peripheral edge being spaced from a surface of the inner wall of said casing of form a gap therebetween;
    said inner wall of said casing being spaced from said outer surface of said filter element; and
    an inlet port formed at the substantial center of the bottom of said casing for introducing water therethrough, so that water introduced through said inlet port flows through the gap formed between the peripheral edge of said bottom plate and the surface of said inner wall of said casing into the space between the inner wall of the said casing and the outer surface of said filter element.

3. The filter device according to claim 2, wherein said peripheral edge of said bottom plate has plural projections for abutting against said surface of said inner wall of said casing to retain said filter element in situ.

4. The filter device according to claim 3, wherein said plural projections are spaced from each other by predetermined angular spacings.

5. The filter device according to claim 2, further comprising a check valve mounted to said inlet port.

6. The filter device according to claim 1, wherein said reinforcing member is a cylindrical member disposed in said casing and having multiple support ribs projecting radially to contact with said corrugated filter membrane, each of said ribs having multiple pores for allowing water to pass therethrough.

7. The filter device according to claim 6, wherein each of said ribs is provided with multiple grooves extending along the radical direction.

8. The filter device according to claim 1, wherein a second filter unit comprising hollow fibers is contained inside of said filter element.

9. The filter device according to claim 1, wherein said reinforcing member is formed to have a corrugated shape and said outer surface of said corrugated reinforcing member comprises an outer peripheral wall having a substantially similar shape as said inner contour of said corrugated filter membrane.

10. The filter device according to claim 1, wherein said reinforcing member is a corrugated support net.

11. The filter device according to claim 1, wherein said reinforcing member includes:
    a first corrugated reinforcing member having its outer surface contacting with an inner surface of said corrugated filter membrane and having multiple pores for allowing water to pass therethrough; and
    a second reinforcing member composed of a cylindrical member disposed in said casing and having multiple support ribs projecting radially to contact with said corrugated first reinforcing member, each of said ribs having multiple pores for allowing water to pass therethrough.

* * * * *